(12) United States Patent
Cressman et al.

(10) Patent No.: US 12,473,036 B2
(45) Date of Patent: Nov. 18, 2025

(54) VEHICLE TIRE GUARD DEVICE

(71) Applicant: Toyota Motor Engineering & Manufacturing North America, Inc., Plano, TX (US)

(72) Inventors: Daniel J. F. Cressman, Ypsilanti, MI (US); Matthew K. Killeen, Ypsilanti, MI (US); Ryan C. Harris, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 283 days.

(21) Appl. No.: 18/446,133

(22) Filed: Aug. 8, 2023

(65) Prior Publication Data
US 2025/0050952 A1     Feb. 13, 2025

(51) Int. Cl.
*B62D 25/18*     (2006.01)
*B62D 25/16*     (2006.01)

(52) U.S. Cl.
CPC ......... *B62D 25/182* (2013.01); *B62D 25/163* (2013.01)

(58) Field of Classification Search
CPC ..... B62D 25/182; B62D 25/163; B62D 35/02
See application file for complete search history.

(56) References Cited

U.S. PATENT DOCUMENTS

| | | | |
|---|---|---|---|
| 3,582,109 A | 6/1971 | Moore | |
| 5,582,431 A | 12/1996 | Anderson | |
| 6,158,775 A | 12/2000 | Nickels | |
| 6,446,900 B1 | 9/2002 | Syska et al. | |
| 6,565,122 B1 | 5/2003 | Hansen | |
| 6,623,038 B2 | 9/2003 | Heem | |
| 6,799,808 B1 | 10/2004 | Walters | |
| 7,185,920 B2 | 3/2007 | Drummond | |
| 8,066,304 B2 | 11/2011 | Ulgen | |
| 8,783,727 B2 | 7/2014 | Flaman | |
| 8,864,176 B2 | 10/2014 | Lasser | |
| 9,352,786 B1 | 5/2016 | Martin | |
| 9,603,305 B2 | 3/2017 | Rau et al. | |
| 9,884,656 B2 | 2/2018 | Proctor | |

(Continued)

FOREIGN PATENT DOCUMENTS

| | | | |
|---|---|---|---|
| CN | 108502029 A | * 9/2018 | ........... B62D 25/182 |
| CN | 108860330 A | * 11/2018 | ........... B62D 25/182 |

(Continued)

*Primary Examiner* — Steve Clemmons
(74) *Attorney, Agent, or Firm* — Christopher G. Darrow; Darrow Mustafa PC

(57) ABSTRACT

Systems, methods, and other embodiments described herein relate to a vehicle tire guard that retracts in response to a force. In one embodiment, the vehicle tire guard device includes a tire guard extending downward from a vehicle frame and a retraction system attached to the vehicle frame. The retraction system includes a spring-loaded wheel with circumferential interface elements to engage with and retract the tire guard responsive to a vertical force applied to the tire guard, a curved cam affixed to a planar surface of the spring-loaded wheel, and a spring-loaded rod biased against the planar surface. The spring-loaded rod and cam interact to prevent rotation of the spring-loaded wheel to retract the tire guard until the vertical force exceeds a threshold.

10 Claims, 9 Drawing Sheets

(56) References Cited

U.S. PATENT DOCUMENTS

| | | | |
|---|---|---|---|
| 9,969,463 B2 | 5/2018 | Pivec | |
| 10,106,210 B2 * | 10/2018 | Miller | G01S 17/931 |
| 10,953,934 B2 * | 3/2021 | Herlem | B62D 35/02 |
| 11,390,329 B2 | 7/2022 | Koontz | |
| 2004/0164539 A1 * | 8/2004 | Bernard | B62D 25/182 |
| | | | 280/848 |
| 2019/0152543 A1 * | 5/2019 | Shiga | B62D 37/02 |
| 2023/0065474 A1 * | 3/2023 | Umino | B62D 37/02 |
| 2023/0143257 A1 * | 5/2023 | Yokoyama | B62D 35/005 |
| | | | 296/180.1 |

FOREIGN PATENT DOCUMENTS

| | | | | |
|---|---|---|---|---|
| CN | 111348109 A * | 6/2020 | | B62D 25/182 |
| CN | 112278090 A * | 1/2021 | | B62D 25/163 |
| DE | 102010026402 A1 * | 1/2012 | | B62D 25/168 |
| DE | 102019102641 A1 * | 8/2020 | | B62D 25/182 |
| EP | 0791526 A2 * | 8/1997 | | B62D 25/188 |
| EP | 3689719 A1 * | 8/2020 | | B62D 37/02 |
| EP | 3590794 B1 * | 2/2021 | | B62D 25/182 |
| FR | 2798110 A1 * | 3/2001 | | B62D 25/16 |

* cited by examiner

VEHICLE TIRE GUARD DEVICE

TECHNICAL FIELD

The subject matter described herein relates, in general, to vehicle tire guards and, more particularly, to vehicle tire guards that automatically retract responsive to an applied force on the tire guard.

BACKGROUND

Loose debris and objects are found on many road surfaces, especially on off-road or non-paved trails. As vehicles travel over the debris and objects, they are propelled backwards towards rear portions of the vehicle or trailing vehicles. Vehicle tire guards, or "mud flaps," reduce the volume of dirt and debris thrown backward. Tire guards made of a flexible material reduce wind resistance while increasing durability. However, impact forces may damage the tire guard and thereby impact the tire guard's capability to prevent dirt and debris discharge. As such, there is a continued interest in tire guards that have robust durability with respect to encountered impact and forces.

SUMMARY

In one embodiment, example systems and methods relate to a manner of improving the capabilities of a vehicle tire guard. In one embodiment, a vehicle tire guard device for retraction of a vehicle tire guard is disclosed. The vehicle tire guard device includes a tire guard extending downward from a vehicle frame and a retraction system attached to the vehicle frame. The retraction system includes a spring-loaded wheel with circumferential interface elements to engage with and retract the tire guard responsive to a vertical force applied to the tire guard, a curved cam affixed to a planar surface of the spring-loaded wheel, and a spring-loaded rod biased against the planar surface. The spring-loaded rod and cam interact to prevent rotation of the spring-loaded wheel to retract the tire guard until the vertical force exceeds a threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving vehicle tire guard capability and operational life are disclosed herein. As previously described, tire guards, or mud flaps, keep debris away from painted portions of the vehicle and prevent debris from being propelled by a rotating tire of the vehicle toward another vehicle. Unfortunately, tire guards can be damaged or disconnected from the vehicle, for example via collision with a road imperfection or an object in the road. Accordingly, the vehicle tire guards of the present disclosure retract responsive to a collision, thus preventing 1) damage to the tire guard and 2) separation of the tire guard from the vehicle. As such, the present vehicle tire guards have a greater capacity to prevent debris discharge.

The vehicle tire guard device includes a retractable tire guard and a spring-loaded wheel which lockingly moves the tire guard from a deployed position to a retracted position responsive to a vertical force applied to the tire guard. Specifically, the vehicle tire guard device includes a tire guard that, in a deployed position, extends downward from a vehicle frame behind a vehicle tire. A plurality of slots formed in the tire guard are engaged by respective arms extending from the spring-loaded wheel. The spring-loaded wheel includes a clock, or torsional, spring that provides a biasing force toward retraction of the tire guard. The spring-loaded wheel is locked in position by 1) a spring-loaded rod that rests against a planar surface of the spring-loaded wheel and 2) a cam. Responsive to a vertical force, the spring-loaded rod slides along the cam, thus allowing the clock spring to rotate the spring-loaded wheel. As the spring-loaded wheel rotates, the arms engage with the slots in the tire guard to raise the tire guard in a vertical direction and away from any object which may damage the tire guard.

In this way, the disclosed systems, methods, and other embodiments improve the resiliency of a vehicle's tire guard by automatically retracting the tire guard in response to a threshold amount of force in a vertical direction. The ability to automatically react responsive to encountered forces protects the tire guard until selectively deployed to prevent the discharge or kickback of dirt and debris thrown by a tire during travel.

Figure 1:
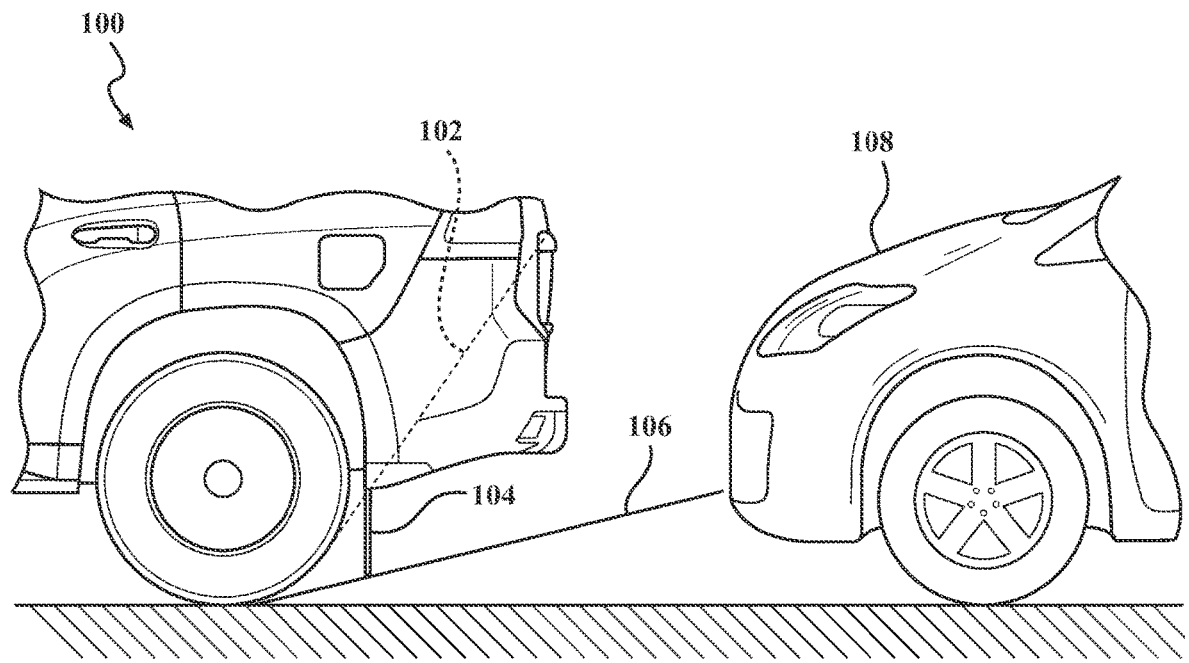
FIG. 1 illustrates one embodiment of a vehicle within which the vehicle tire guard device with a retractable tire guard disclosed herein may be implemented.

FIG. 1 illustrates one embodiment of vehicle 100 within which the vehicle tire guard device with a retractable tire guard 104 disclosed herein may be implemented. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes tires or wheels, and thus benefits from the functionality discussed herein associated with preventing debris from being propelled backward.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a vehicle tire guard device that is implemented to perform methods and other functions as disclosed herein relating to improving tire guard capability and longevity.

The vehicle 100 has a body supported by a suspension that can consist of wheels, tires, springs, shocks, struts, and linkages. The vehicle 100 body may be of any type, including a truck, car, van, racecar, or sport utility vehicle. The vehicle 100 can be powered by any energy source, such as an internal combustion engine, electric battery, or solar panel, to traverse roadways, racetracks, and/or off-road trails. At any time, one or more other vehicles 108 may be positioned behind a primary vehicle 100, as measured opposite a direction of travel.

As the vehicle 100 moves and the tires rotate, dirt, debris, and other objects can be propelled backward, as illustrated by segmented lines 102 that indicate a region where the dirt, debris, or other objects may be directed. The risk of throwing dirt and other objects onto portions of the vehicle 100, as well as other proximal vehicles 108, can threaten safe travel and vehicle 100/108 performance. To mitigate such risk, a tire guard 104 can be employed to reduce the potential area where dirt, debris, and other objects can be thrown, as illustrated by solid line 106.

The tire guard 104 can be constructed of materials that provide a flexible, rigid, or semi-rigid article that is affixed to the vehicle 100 to reduce the coverage area for objects thrown by rotating tires without impeding the operation of the suspension. For instance, the vehicle 100 can move, turn, absorb varying terrain, and dampen undulations in a roadway/trail without degraded capabilities or performance due to the presence and operation of the tire guard 104.

Figure 2:
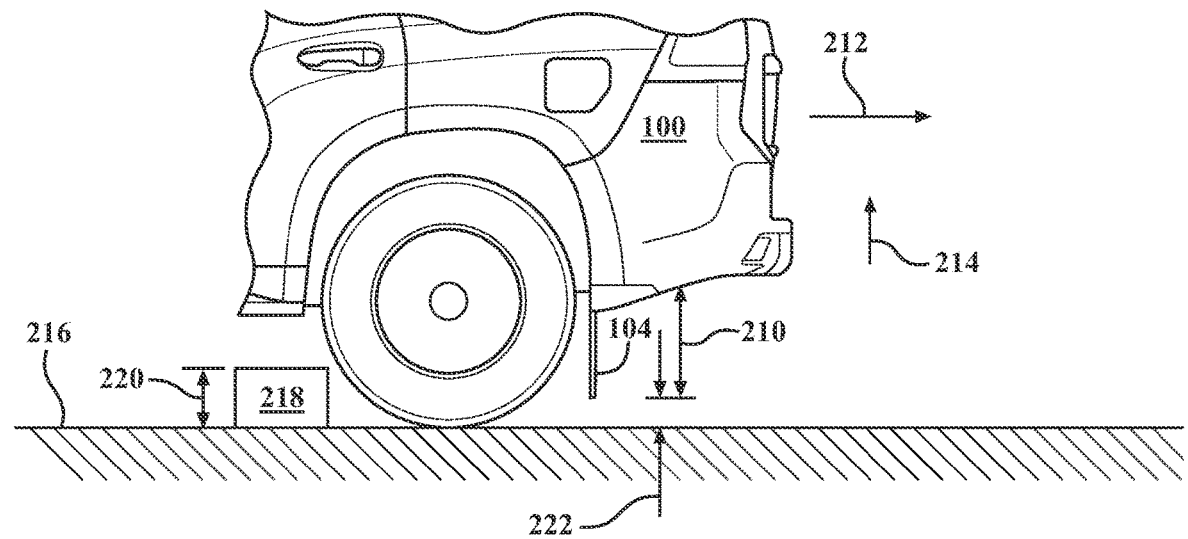
FIG. 2 illustrates one embodiment of a vehicle within which the vehicle tire guard device with a retractable tire guard disclosed herein may be implemented.

FIG. 2 illustrates one embodiment of a vehicle 100 within which the vehicle tire guard device with a retractable tire guard 104 disclosed herein may be implemented. The tire guard 104 is affixed to the vehicle frame behind the vehicle tire and continuously extends a length 210 downward from the vehicle frame to reduce the area to which dirt and objects are thrown during travel. The greater the tire guard length 210, the smaller the area where dirt and objects may be thrown. However, tire guard length 210 can increase the chance of damage to the tire guard 104 and reduce the integrity and resiliency of the tire guard 104 itself.

While the construction and attachment to a vehicle frame are not limited to a particular configuration or functional capability for a tire guard 104, various examples arrange a tire guard 104 with a rigidity that can withstand a variety of dynamic forces from airflow, water, snow, dirt, debris, and objects impacting the tire guard 104. For instance, the tire guard 104 may be constructed of metal, plastic, ceramic, or any combination thereof to provide ample strength and rigidity to withstand dynamic forces from a horizontal direction as indicated by the arrow 212, such as a direction opposite the direction of travel for the vehicle 100 and/or a direction parallel to the longitudinal axis of the vehicle body.

It is contemplated that a tire guard 104 can have a variety of different forms with constructions and vehicle attachments that provide different functional capabilities, such as rigidity, aerodynamics, strength, and durability. Regardless of the tire guard 104 form, the tire guard length 210 creates a susceptibility to impact in a vertical direction 214, which can be characterized as perpendicular to the direction of vehicle travel, longitudinal axis of the vehicle 100, and ground surface 216.

As an example, the tire guard 104 can physically contact the ground surface 216 and/or an object 218 resting on the ground surface 216. Such contact imparts a force on the tire guard 104 in the vertical direction 214 that can damage the tire guard 104 and/or the body and frame of the vehicle 100. In other words, the tire guard 104 can withstand a diverse variety of impact forces in a range of directions that are horizontal, as indicated by the arrow 212, but is vulnerable to forces in the vertical direction 214. Such vulnerability can pose a greater risk of damage when the vehicle 100 is participating in off-road activities, such as racing, trail driving, or rock climbing, where ruts and objects 218 may have a height 220 that is greater than the distance 222 from the bottom of the tire guard 104 to the ground surface 216.

With a susceptibility to impact and resulting damage in response to impact along the vertical direction 214, the present vehicle tire guard 104 automatically reacts responsive to a force in the vertical direction 214 by retracting the tire guard 104 from an extended position, as illustrated in FIGS. 1 and 2, to a retracted position where the risk of impact, and consequential damage to the tire guard 104 and/or vehicle 100, is reduced.

Figure 3:
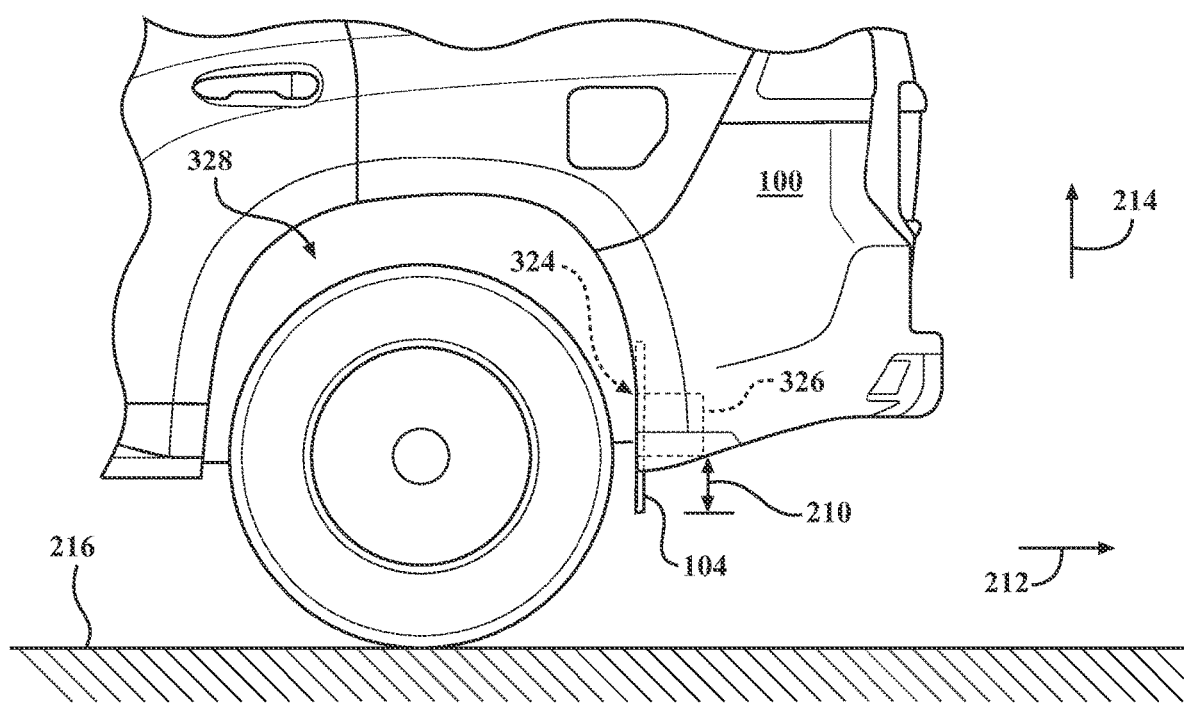
FIG. 3 illustrates one embodiment of a vehicle within which the vehicle tire guard device with a retractable tire guard disclosed herein may be implemented.

FIG. 3 illustrates one embodiment of vehicle 100 within which the vehicle tire guard device 324 and a retractable tire guard 104 disclosed herein may be implemented. Specifically, FIG. 3 illustrates the retraction system 326 that retracts the tire guard 104 in response to a vertical force encountered on the tire guard 104 in the vertical direction 214. As described above, the vehicle tire guard device 324 is affixed to the vehicle 100 behind the vehicle tire and controls the position of a tire guard 104. For instance, the vehicle tire guard device 324 may be mounted to a frame, fender, or suspension component of the vehicle 100 to maintain the tire guard 104 in an extended position, as shown by solid lines, in response to encountered vertical impact forces.

The retraction system 326 can have stored potential energy that, in response to force/impact in the vertical direction 214 above a threshold, moves the tire guard 104 into a retracted position. While in the retracted position, the tire guard length 210 is reduced by physically moving portions of the tire guard 104 to a location covered by the body of the vehicle 100. For example, the tire guard 104 may be retracted into the wheel well 328 where at least the vehicle fender protects the tire guard 104 from physical contact with the ground surface 216 and stationary objects 218.

While the retraction system 326 can be configured as any assembly that responds to force being applied to a tire guard 104 above a predetermined threshold in a vertical direction, some examples utilize spring force to store potential energy that can automatically move a tire guard 104 in response to a vertical force.

Figure 4A:
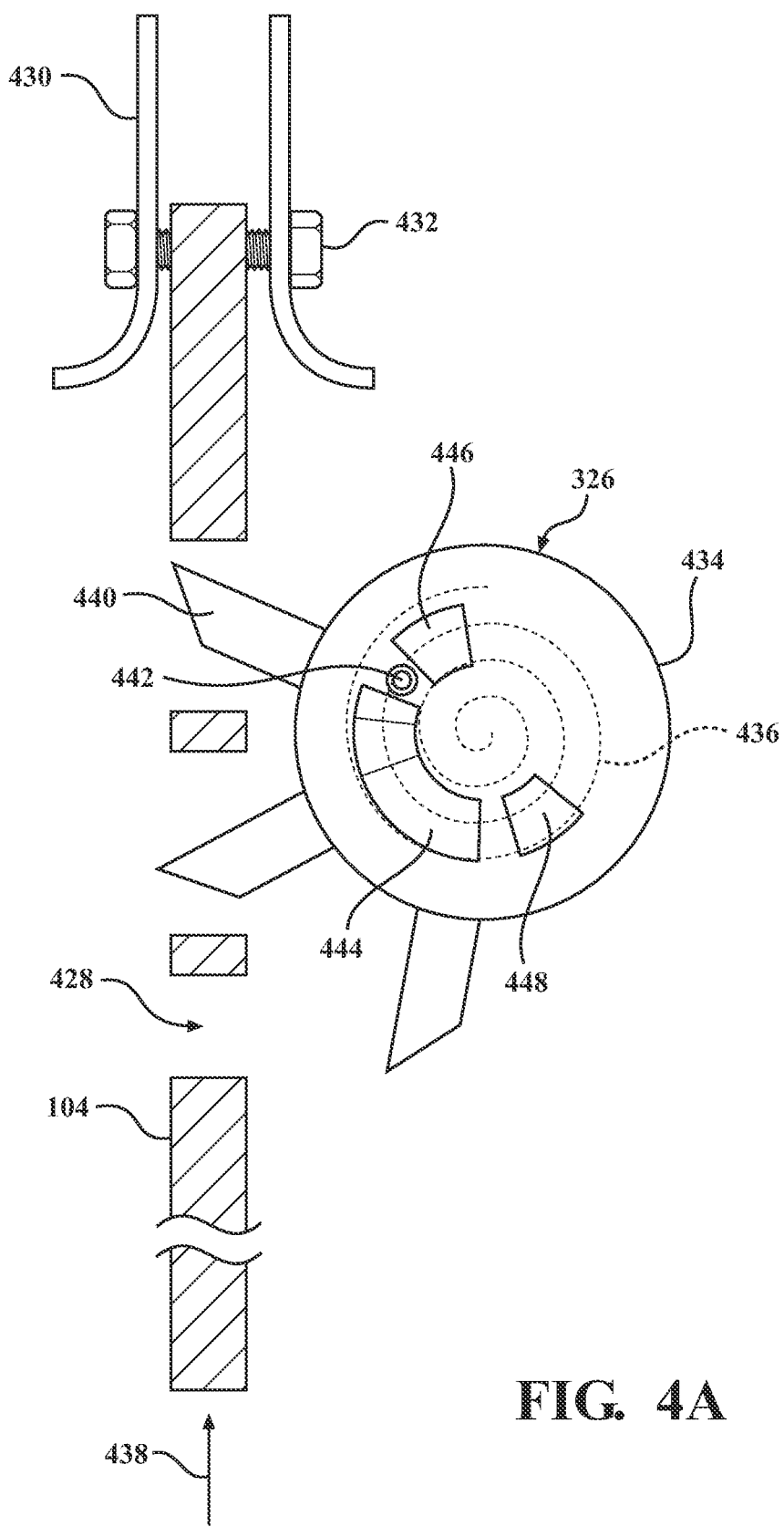
FIGS. 4A and 4B depict a side view of the vehicle tire guard device with a retractable tire guard disclosed herein.
Figure 4B:
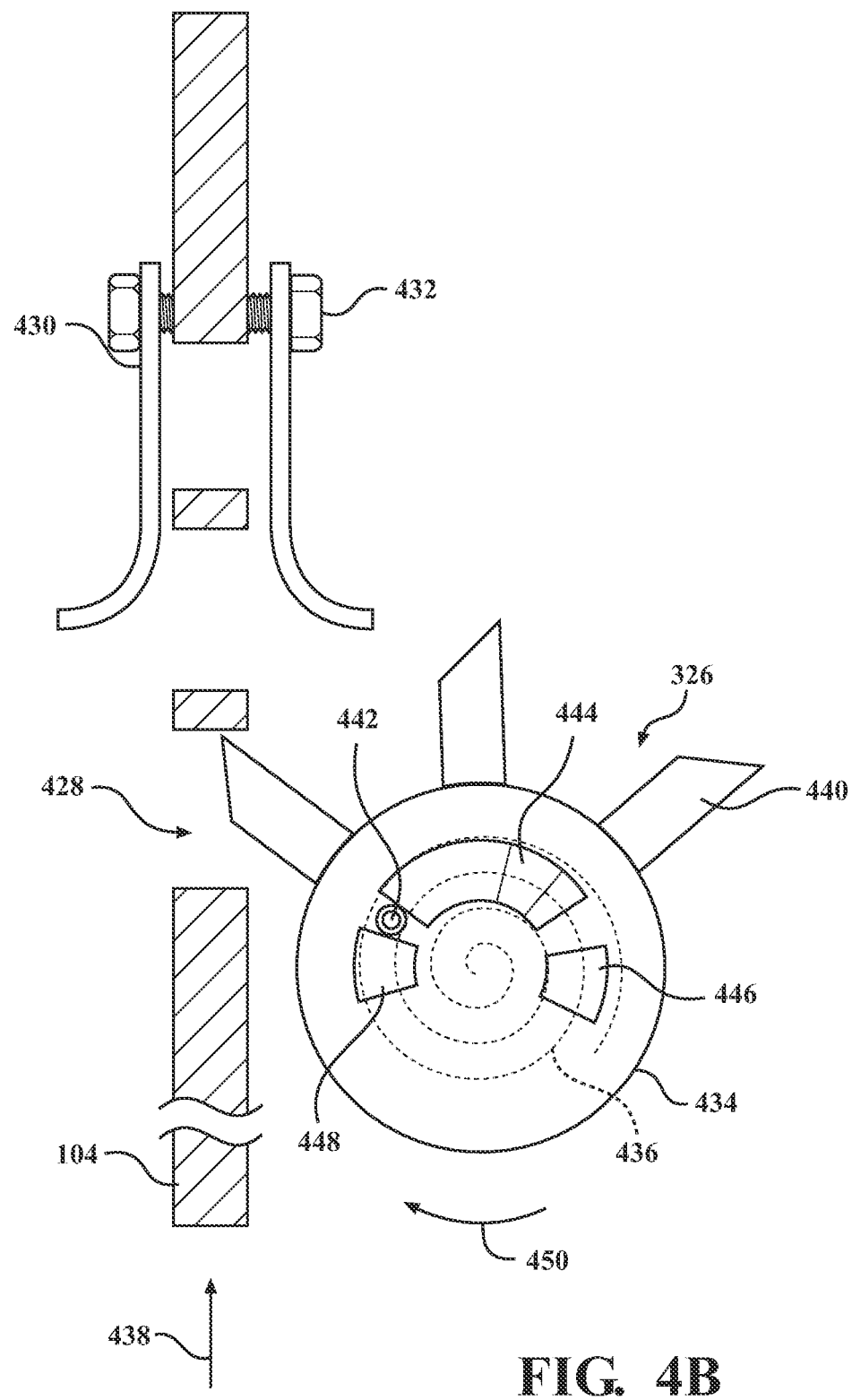

FIGS. 4A and 4B illustrate a cross-sectional side view of the vehicle tire guard device 324 with a retractable tire guard 104. Specifically, FIG. 4A depicts the tire guard 104 in a deployed and extended position below the vehicle frame and behind the vehicle tire as depicted in FIGS. 1 and 2 and FIG.

4B depicts the tire guard in a retracted or protected position behind the vehicle tire as depicted in FIG. 3.

As described above, the vehicle tire guard device 324 includes a tire guard 104 that extends downward from the vehicle frame. In an example, the tire guard 104 includes a number of slots 428 that interact with circumferential interface elements on the spring-loaded wheel 434 to retract the tire guard 104. That is, as the spring-loaded wheel 434 rotates, the arms 440 extending from the circumference of the spring-loaded wheel 434 are inserted into the slots 428 and push up the slots 428 to retract the tire guard 104. As such, the rotation motion of the spring-loaded wheel 434 translates the tire guard 104 in a vertical direction. In an example, the slots 428 extend across the entire width of the tire guard 104, which width is perpendicular to the length 210 of the tire guard 104 as depicted in FIGS. 1-3. In another example, the slots 428 extend across less than the entire width of the tire guard 104 to provide a greater object-deflecting surface area for the tire guard 104.

As described above, the tire guard 104 moves up and down relative to the vehicle frame 430. As such, the vehicle tire guard device 324 includes a retention device to translationally couple the tire guard 104 to the vehicle frame 430. In the example depicted in FIG. 4A, the retention device includes a shaft 432, such as a bolt, which is attached to the tire guard 104 and which slides vertically in a corresponding slot in the vehicle frame 430. While particular reference is made to a particular translational coupling between the tire guard 104 and the vehicle frame 430, other types of retention devices that facilitate translational coupling may be implemented in accordance with the principles described herein.

FIG. 4A also depicts the retraction system 326 which is also mounted to the vehicle frame 430. As the retraction system 326 includes components that rotate, such as the spring-loaded wheel 434, the retraction system 326 may be mounted to the vehicle 100 so as to allow rotation of the spring-loaded wheel 434 relative to the rotationally stationary vehicle 10. Such a coupling may include, for example bearings or bushings.

The retraction system 326 includes a spring-loaded wheel 434 positioned about a central axis with a clock, or torsional, clock spring 436 that provides rotational force to the spring-loaded wheel 434. While FIGS. 4A and 4B depict a clock spring 436, it is noted that the retraction system 326 may include any number of clock springs 436, or other types of energy-storing components, to exert continuous force upon the spring-loaded wheel 434. In FIGS. 4A and 4B, the clock spring 436 is indicated in dashed lines to indicate its position internal to the spring-loaded wheel 434. However, in other examples, the clock spring 436 may be external to the spring-loaded wheel 434.

Disposed around a circumference of the spring-loaded wheel 434 are circumferential interface elements that engage with and retract the tire guard 104 responsive to a vertical force 438 applied to the tire guard 104. In the example depicted in FIGS. 4A and 4B, the circumferential interface elements comprise arms 440 extending from the spring-loaded wheel 434. The arms 440 interact with the slots 428 formed in the tire guard 104 to allow the stored energy of the clock spring 436 to physically translate the tire guard 104 upwards in a direction parallel to the vertical force 438 direction. While FIGS. 4A and 4B depict an arm 440/slot 428 interaction, the tire guard 104 and the spring-loaded wheel 434 may include other interface elements such as respective teeth that enmesh with one another to convert the rotational movement of the spring-loaded wheel 434 to translational movement of the tire guard 104 as depicted in FIGS. 4A and 4B.

As described above, the spring-loaded wheel 434 is biased to position the tire guard 104 in the retracted position depicted in FIG. 3. To prevent vertical movement of the tire guard 104 in the absence of the vertical force 438, i.e., to counter the clock spring 436 force, the retraction system 326 includes a curved cam 444 affixed to a planar surface of the spring-loaded wheel 434 and a spring-loaded rod 442 that continuously exerts a force against the planar surface of the spring-loaded wheel 434. The spring-loaded rod 442 and the curved cam 444 prevent the rotation of the spring-loaded wheel 434 to retract the tire guard 104.

Figure 5A:
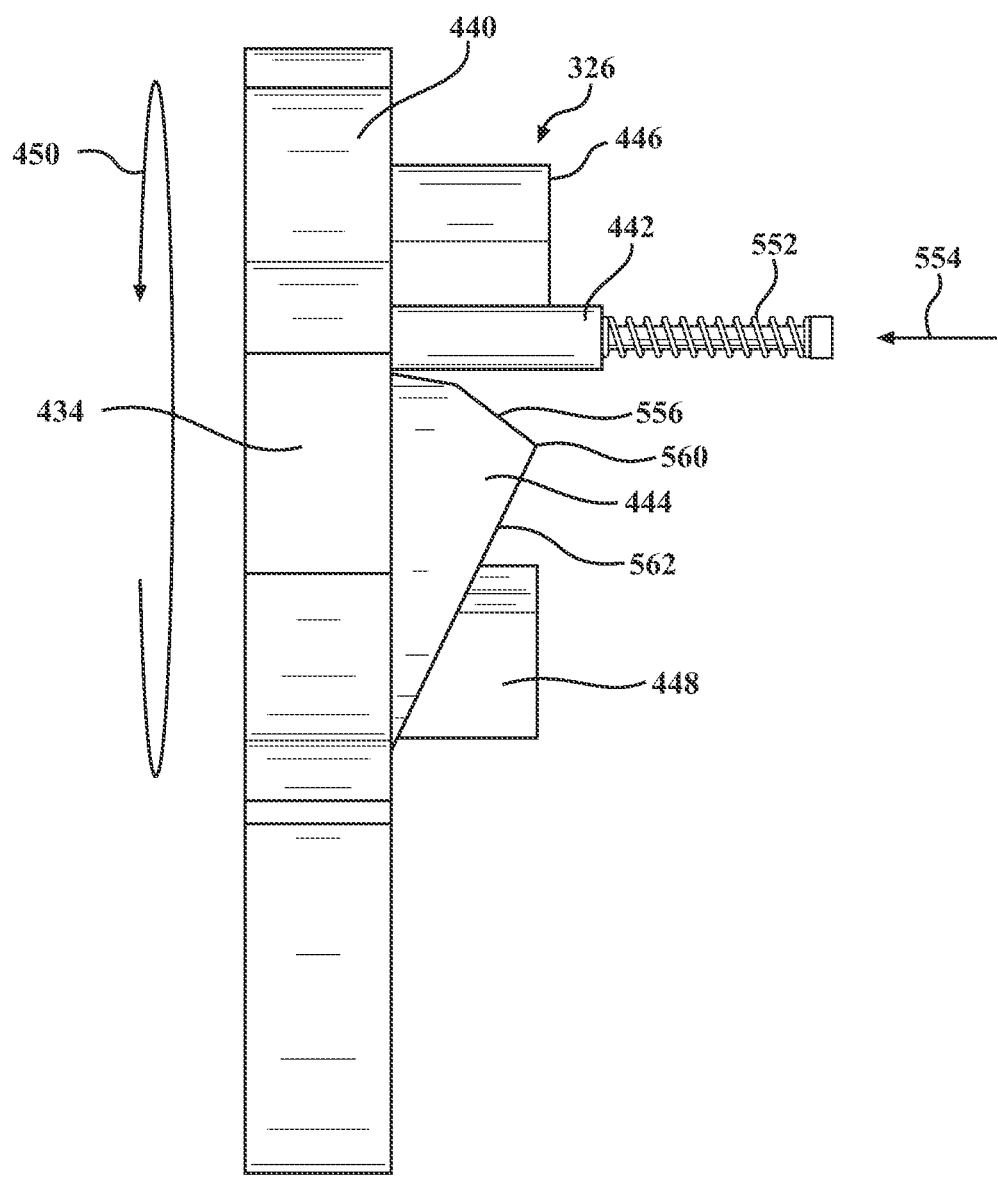
FIGS. 5A through 5D depict a rear view of the retraction system disclosed herein.
Figure 5B:
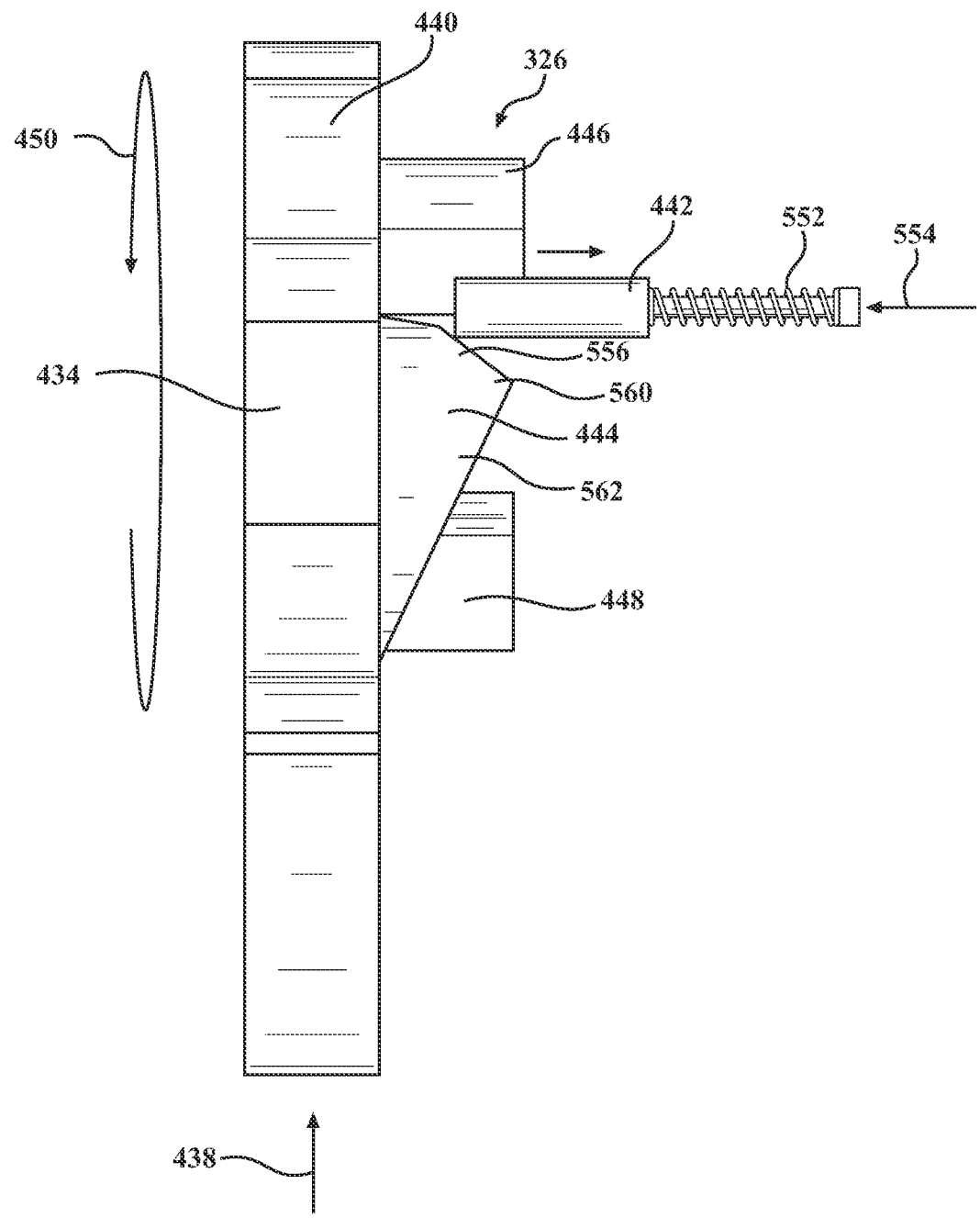

That is, as depicted in FIG. 5A, absent a vertical force 438, a compression spring of the spring-loaded rod 442 presses against the spring-loaded wheel 434 surface to prevent the spring-loaded wheel 434 from rotating. However, as depicted in FIG. 5B, the vertical force 438 causes the tire guard slots 428 to interact with the arms 440 to rotate the spring-loaded wheel 434. This rotational force, when greater than a threshold amount and in combination with the spring force of the clock spring 436, overcomes the spring force of the spring-loaded rod 442 such that the spring-loaded rod 442 disengages from the planar surface of the spring-loaded wheel 434. As such the rotation-blocking force from the spring-loaded rod 442 is removed and the clock spring 436 is allowed to rotate the spring-loaded wheel 434 and retract the tire guard 104. That is, the spring-loaded rod 442 resists the rotation of the spring-loaded wheel 434 until a vertical force 438 on the tire guard 104 exceeds a predetermined threshold amount. As a result, the spring-loaded rod 442 moves and separates from the spring-loaded wheel 434 in a manner that allows energy of the clock spring 436 to rotate the spring-loaded wheel 434, along with the tire guard 104, via engagement of at least arm 440 with at least one tire guard slot 428.

It is noted that an impact on a tire guard 104 can impart force in multiple different directions concurrently, of which one may occur in the vertical direction. In other words, an encountered impact on a tire guard 104 can have multiple different force vectors and, as long as one force vector is in the vertical direction and exceeds the threshold amount, the retraction system 326 operates to retract the tire guard 104.

In an example, the retraction system 326 further includes a leading edge stop 446 and a trailing edge stop 448 affixed to the planar surface of the spring-loaded wheel 434 on either side of the curved cam 444 to prevent over-rotation of the spring-loaded wheel 434.

FIG. 4B illustrates the result of the vertical force 438 greater than a threshold amount being applied to the tire guard 104. When the vertical force 438 overcomes the spring force of the spring-loaded rod 442, the curved cam 444 rotates along with the spring-loaded wheel 434 as indicated by the arrow 450. This rotation removes the rotation-preventing force of the spring-loaded rod 442 such that the clock spring 436 energy rotates the spring-loaded wheel 434 as indicated by the arrow 450. This rotation, on account of the interaction between the arms 440 and the slots 428, translates the tire guard 104 upward and into a retracted position in a wheel well 328 of a vehicle 100. This translational movement is facilitated by the translational coupling of the tire guard 104 to the vehicle frame 430.

Note that in this retracted position, the spring-loaded rod 442 rests against the trailing edge stop 448 such that the spring-loaded wheel 434 does not continue to vertically translate the tire guard 104. That is, the leading edge stop 446 and the trailing edge stop 448 define a range of rotational motion of the spring-loaded wheel 434 and of the translational motion of the tire guard 104.

The non-limiting example of the vehicle tire guard device 324 and the retraction system 326 shown in FIGS. 4A and 4B depict how a vertical force 438 above a predetermined threshold causes movement of the spring-loaded rod 442 and automatic release of clock spring 436 force that brings the tire guard 104 upward and into a retracted position where the tire guard 104 is farther from a ground surface 216 than when in an extended tire guard 104 position. In other words, the automatic activation of the retraction system 326 reduces the tire guard length 210 by physically moving the tire guard 104.

The vehicle tire guard device 324 further allows for selective movement of the tire guard 104 downward from the retracted position to the extended position that positions the tire guard 104 closer to the ground surface 216. Such selective downward tire guard 104 movement can be facilitated manually, via pulling the tire guard 104 in a downward direction that is opposite the vertical force 438, or forcing the spring-loaded wheel 434 and clock spring 436 to rotate, via hydraulic, electric, magnetic, or pneumatic components, to a point where the spring-loaded rod 442 engages the planar surface of the spring-loaded wheel 434 to prevent further wheel 434 rotation. That is, the vehicle tire guard device 324 allows automatic upward tire guard movement in response to a predetermined vertical force and manual or automated downward movement upon selection by a user.

Figure 5C:
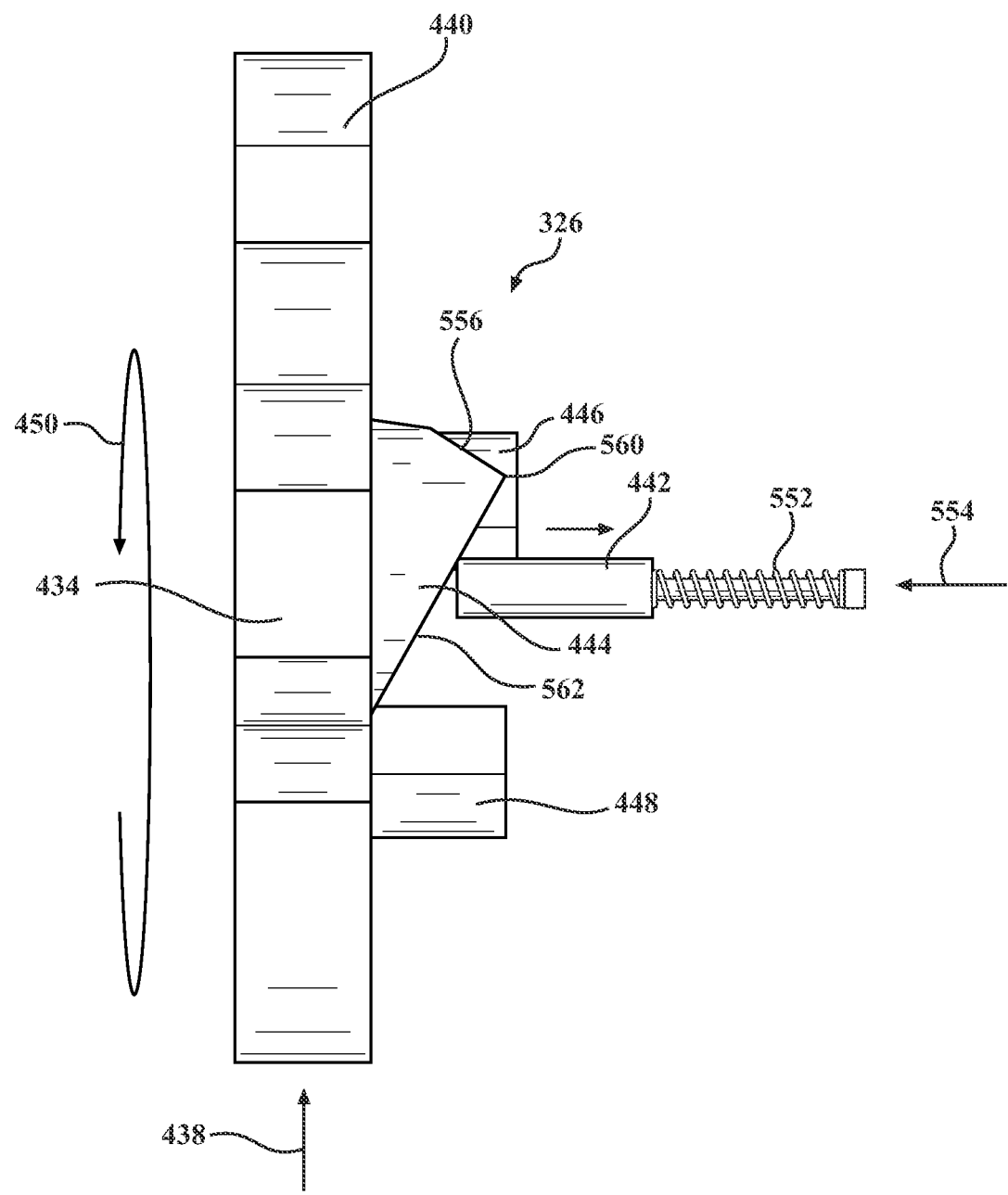
Figure 5D:
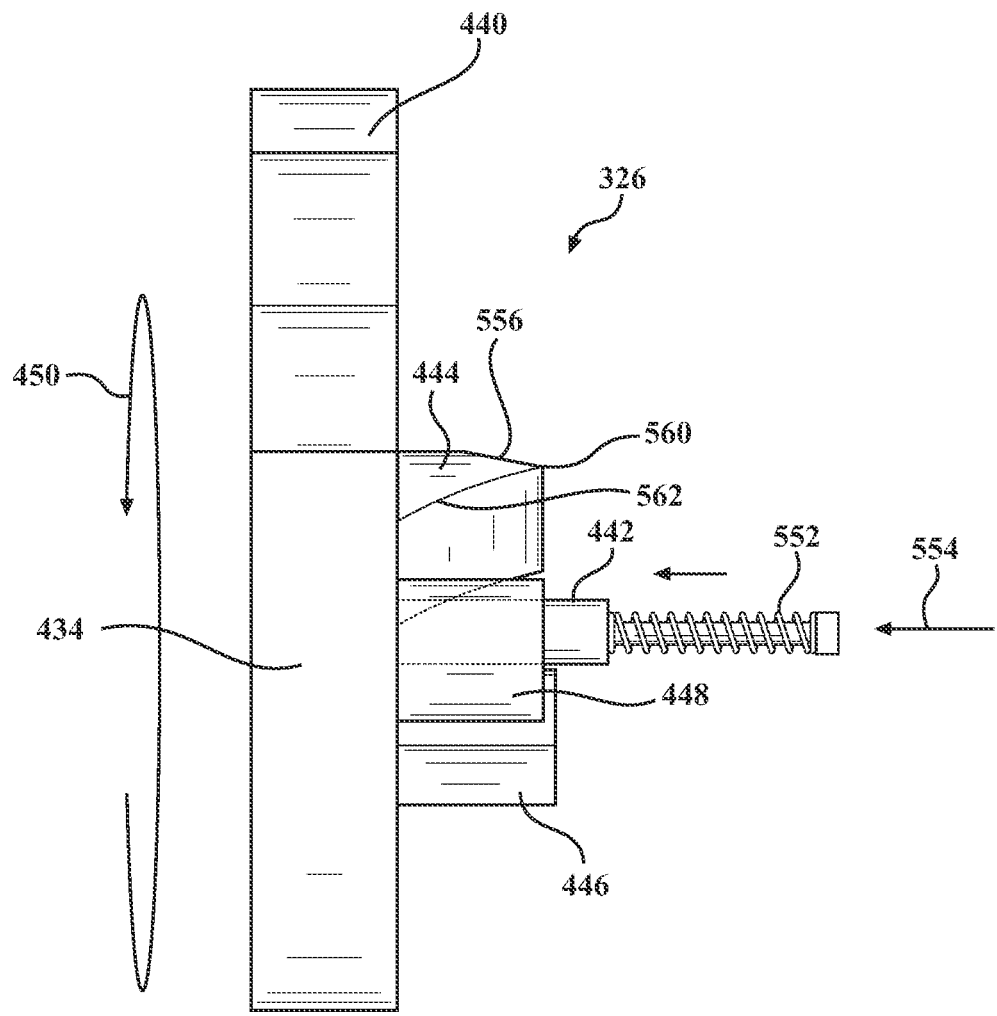

FIGS. 5A through 5D depict a rear view of the retraction system 326 disclosed herein. Specifically, FIG. 5A depicts the retraction system 326 with the tire guard 104 in an extended position, FIGS. 5B and 5C depict the retraction system 326 with the tire guard 104 in various stages of retraction, and FIG. 5D depicts the retraction system 326 in a retracted position. FIGS. 5A-5D depict the spring-loaded wheel 434. For simplicity, the arms 440 have been omitted in FIGS. 5A-5D. FIGS. 5A-5D also depict the leading edge stop 446 and the trailing edge stop 448 which prevent over-rotation of the spring-loaded wheel 434.

FIGS. 5A-5D also depict additional detail regarding the curved cam 444 and the interaction of such with the spring-loaded rod 442 to prevent rotation of the spring-loaded wheel 434 until a vertical force 438 exceeds a predetermined threshold amount. As described above, the curved cam 444, as well as the leading edge stop 446 and the trailing edge stop 448, are affixed to a planar surface of the spring-loaded wheel 434 and, as such, rotate with the spring-loaded wheel 434. By comparison, the spring-loaded rod 442 is a separate component from the spring-loaded wheel 434 and does not rotate along with the spring-loaded wheel 434.

The curved cam 444 includes a sloped leading surface 556 in a rotational direction of the spring-loaded wheel 434 to retract the tire guard 104. The spring-loaded rod 442 sits in front of the sloped leading surface 556 in the absence of a vertical force 438 greater than a threshold amount and prevents the rotation of the spring-loaded wheel 434. That is, the spring force of the clock spring 436 is less than the spring force of the compression spring 552 such that the frictional force 554 of the spring-loaded rod 442 against the planar surface of the spring-loaded wheel 434 prevents the clock spring 436 from rotating the spring-loaded wheel 434.

However, the combination of the clock spring 436 and the vertical force 438 is greater than the spring force of the spring-loaded rod. Specifically, the vertical force 438 pushes upward on the tire guard 104, which acts on the arms 440 to exert a rotational force on the spring-loaded wheel 434. The force of the compression spring 552 is overcome by the combination of 1) the rotational force caused by the vertical force 438 and 2) the spring force of the clock spring 436. The result is that the curved cam 444 and spring-loaded wheel 434 rotate such that the spring-loaded rod 442 slides across the sloped leading surface 556 away from the spring-loaded wheel 434 as depicted in FIGS. 5B and 5C.

The angle of the sloped leading surface 556 defines the threshold amount that the vertical force 438 must overcome to cause retraction of the tire guard 104. For example, a greater slope, i.e., a steeper slope, would result in a lower threshold force, while a more gentle slope, i.e., a more horizontal slope, would result in a greater threshold force. As depicted in FIGS. 5A-5D, in an example, the sloped leading surface 556 is a multi-sloped surface.

As depicted in FIGS. 5A-5D, the curved cam 444 further includes an apex 560 between the sloped leading surface 556 and a sloped trailing surface 562. This apex 560 represents a point at which the vertical force 438 is no longer needed to allow rotation of the spring-loaded wheel 434. That is, before the apex 560, a vertical force 438 and the clock spring 436 force together overcome the compression spring 552 force. However, following the apex 560, the clock spring 436 force alone is enough to allow the spring-loaded wheel 434 to rotate. In an example, the sloped trailing surface 562 is orthogonal to the sloped leading surface 556. Given the reverse slope of the sloped trailing surface 562, the spring-loaded wheel 434 is free to rotate until the spring-loaded rod 442 rests against the trailing edge stop 448 as depicted in FIG. 5D, at which point the tire guard 104 is in the retracted position.

Figure 6:
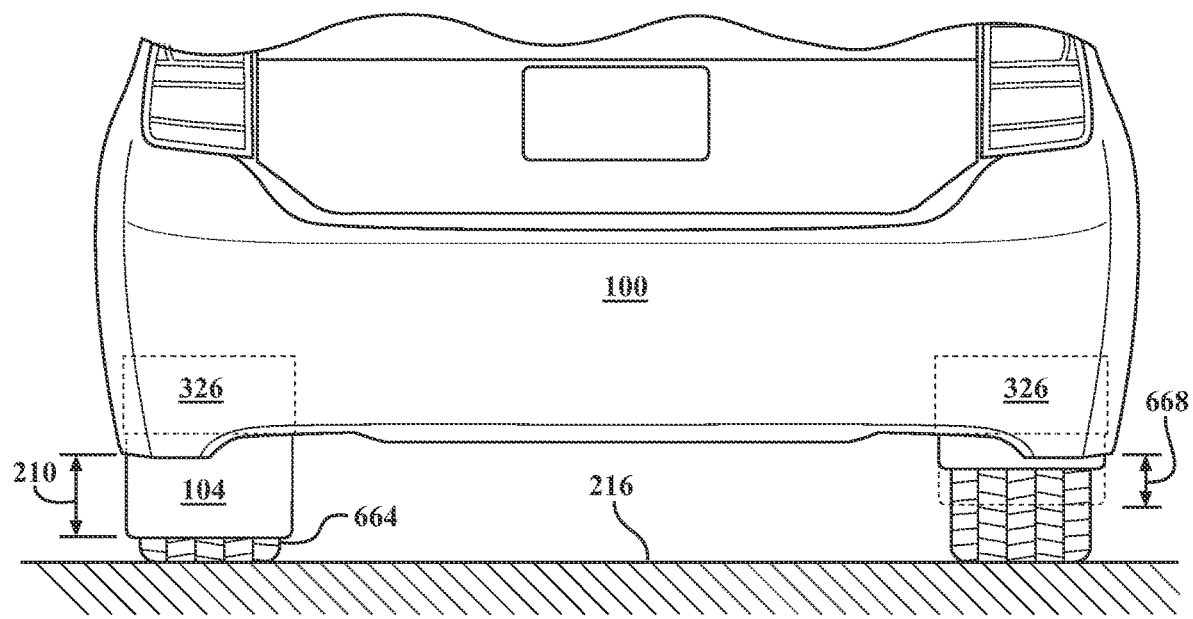
FIG. 6 illustrates one embodiment of a vehicle within which the vehicle tire guard device with a retractable tire guard disclosed herein may be implemented.

FIG. 6 illustrates one embodiment of a vehicle 100 within which the vehicle tire guard device 324 with a retractable tire guard 104 disclosed herein may be implemented. Specifically, FIG. 6 depicts a vehicle 100 in which multiple vehicle tire guard devices 324 can be employed. The example vehicle 100 of FIG. 6 has separate tire guards 104 that are respectively aligned with separate tires 664 to reduce the area where each tire 664 can propel dirt, debris, and other objects, as illustrated in FIG. 1.

Despite each tire guard 104 providing similar capabilities to mitigate the travel of loose objects, the respective tire guards 104 can be independently operated via separate retraction systems 326. As shown, a first retraction system 326 can retract a first tire guard 104 in an extended position where the tire guard length 210 is in a fully extended state while a second retraction system 326 retains a second tire guard 104 in a protected position that is more elevated from the ground surface 216 as compared to the first tire guard.

It is contemplated that each vehicle tire guard device 324 can operate automatically and independently in response to encountered force upon a tire guard 104. As a result, the respective tire guards 104 of a vehicle 100 can concurrently be in different positions, which can be characterized as having different tire guard lengths 210. The independent operation of separate tire guard devices 324 of a single vehicle 100 further allows for custom tire guard lengths 210 and operating positions. For instance, the tire guard length 210 associated with an extended tire guard may be different for separate tire guards 104 of a vehicle 100. Likewise, the retracted position of separate tire guards 104 may be deliberately different, in some embodiments.

In other embodiments of a vehicle tire guard device 324, the position of a tire guard 104 can be manually customized. As illustrated, a retraction system 326 can be manipulated manually, or via automated activation, to have a particular tire guard length 668 between a fully extended tire guard length 210 and a minimum tire guard length associated with the retracted position. It is noted that the respective tire guards 104 of a vehicle 100 can be collectively controlled by a single retraction system 326 instead of the independent retraction systems 326 shown in FIG. 6. The ability to provide independent tire guard 104 response to encountered forces along with the ability to provide custom tire guard 104 positions allows a vehicle 100 to enjoy optimized operation where object coverage area and risk of damage to a tire guard 104 and fender are each minimized.

While FIG. 6 depicts two tire guards 104 and respective vehicle tire guard devices 324, it is noted that a vehicle 100 can utilize four separate vehicle tire guard devices 324 that are similarly, or dissimilarly, configured to automatically retract a respective tire guard 104 in response to a force above a predetermined threshold in a vertical direction 214. That is, separate vehicle tire guard device 324 of a single vehicle 100 can be configured differently, such as with dissimilar threshold force amounts to trigger automatic retraction of a tire guard 104 from an extended position to a retracted position.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle tire guard device, comprising:
 a tire guard extending downward from a vehicle frame; and
 a retraction system attached to the vehicle frame, the retraction system comprising:
  a spring-loaded wheel with circumferential interface elements to engage with and retract the tire guard responsive to a vertical force applied to the tire guard;
  a curved cam affixed to a planar surface of the spring-loaded wheel; and
  a spring-loaded rod biased against the planar surface, the spring-loaded rod and the curved cam interact to prevent rotation of the spring-loaded wheel to retract the tire guard until the vertical force exceeds a threshold.

2. The vehicle tire guard device of claim 1, wherein the spring-loaded wheel is biased to position the tire guard in a retracted position.

3. The vehicle tire guard device of claim 1, wherein rotation motion of the spring-loaded wheel translates the tire guard in a vertical direction.

4. The vehicle tire guard device of claim 1, wherein:
 the curved cam comprises a sloped leading surface in a rotational direction of the spring-loaded wheel to retract the tire guard;
 the spring-loaded rod sits in front of the sloped leading surface in the rotational direction and presses against the planar surface in absence of the vertical force; and
 the vertical force causes the spring-loaded wheel to rotate such that the spring-loaded rod slides across the sloped leading surface.

5. The vehicle tire guard device of claim 4, wherein:
 the curved cam further comprises an apex between the sloped leading surface and a sloped trailing surface;
 the sloped trailing surface is orthogonal to the sloped leading surface; and
 as the spring-loaded rod reaches the apex:
  a clock spring of the spring-loaded wheel rotates the spring-loaded wheel; and
  the circumferential interface elements retract the tire guard.

6. The vehicle tire guard device of claim 4, wherein the sloped leading surface is a multi-sloped surface.

7. The vehicle tire guard device of claim 1, wherein:
 a spring force of a clock spring of the spring-loaded wheel is less than the spring force of a compression spring of the spring-loaded rod; and
 a combination of the spring force of the clock spring and the vertical force is greater than the spring force of the compression spring.

8. The vehicle tire guard device of claim 1, wherein the circumferential interface elements comprise arms extending from the spring-loaded wheel that interact with slots formed in the tire guard.

9. The vehicle tire guard device of claim 1, further comprising a leading edge stop and a trailing edge stop affixed to the planar surface of the spring-loaded wheel on either side of the curved cam to prevent over-rotation of the spring-loaded wheel.

10. The vehicle tire guard device of claim 1, further comprising a retention device to translationally couple the tire guard to the vehicle frame, the retention device comprising a shaft attached to the tire guard which slides in a slot in the vehicle frame.

* * * * *